United States Patent
Bakucz

(10) Patent No.: US 10,942,797 B2
(45) Date of Patent: Mar. 9, 2021

(54) FAULT TREE ANALYSIS FOR TECHNICAL SYSTEMS

(71) Applicant: Robert Bosch GmbH, Stuttgart (DE)

(72) Inventor: Peter Bakucz, Klosterlechfeld (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 16/294,291

(22) Filed: Mar. 6, 2019

(65) Prior Publication Data

US 2019/0278647 A1 Sep. 12, 2019

(30) Foreign Application Priority Data

Mar. 7, 2018 (DE) .................... 10 2018 203 374.9

(51) Int. Cl.
*G06F 11/07* (2006.01)
*G06F 11/22* (2006.01)

(52) U.S. Cl.
CPC ........ *G06F 11/0739* (2013.01); *G06F 11/079* (2013.01); *G06F 11/0751* (2013.01); *G06F 11/0793* (2013.01); *G06F 11/2257* (2013.01)

(58) Field of Classification Search
CPC .............. G06F 11/0739; G06F 11/079; G06F 11/0793; G06F 11/2257
See application file for complete search history.

(56) References Cited

U.S. PATENT DOCUMENTS 9,391,874 B2 * 7/2016 Corti .................. H04L 45/28
9,536,146 B2 * 1/2017 Zheng ................ G06K 9/00624

FOREIGN PATENT DOCUMENTS

| DE | 3433556 C2 | 9/1987 |
| DE | 10361931 A1 | 9/2004 |
| DE | 19532484 B4 | 8/2005 |
| DE | 102008040461 A1 | 1/2010 |
| DE | 102008009900 B4 | 12/2010 |
| DE | 102015220449 A1 | 4/2017 |

* cited by examiner

*Primary Examiner* — Joseph R Kudirka
(74) *Attorney, Agent, or Firm* — Norton Rose Fulbright US LLP; Gerard Messina

(57) ABSTRACT

A method for fault tree analysis of a technical system, which includes a plurality of functional units, the technical system being modeled as a tree-like logical linkage of causative events, which may culminate in an undesirable event, and the causative events including malfunctions of individual functional units, a tree-like logical linkage having a self-similar structure being selected. An associated computer program is described. A surroundings detection system and/or a control system for an at least partially automated driving vehicle, including a plurality of functional units having mutual dependencies, which link the functional units in a tree-like structure in such a way that an undesirable event occurs if a logical linkage of causative events is true, the causative events including malfunctions of individual functional units, the tree-like structure being self-similar.

11 Claims, 4 Drawing Sheets

(Stand der Technik)

(Stand der Technik)

FAULT TREE ANALYSIS FOR TECHNICAL SYSTEMS

FIELD OF THE INVENTION

The present invention relates to the fault tree analysis for judging the overall reliability of technical systems which are made up of a plurality of functional units.

BACKGROUND INFORMATION

In technical systems whose malfunction may result in severe physical damage or personal harm it is frequently necessary to judge the reliability quantitatively before beginning operation. Examples of such systems are surroundings detection systems or control systems for at least partially automated driving vehicles.

One standardized method for judging the overall reliability of a system which is made up of a plurality of functional units is the fault tree analysis (FTA). For the purposes of this analysis, the technical system is modeled as a tree-like logical linkage of causative events, which may culminate in an undesirable event ("system failure"). "Tree-like" means that, for example, the system failure occurs if a specific logical linkage of events is true, these events in turn being able to be logical linkages of lower-order events. The causative events include malfunctions of individual functional units.

The aforementioned tree-like modeling of interactions is used, for example, in German Published Patent Appln. No. 10 2008 040 461 in order to diagnose the actually defective component in the event of a malfunction of the vehicle. According to German Published Patent Appln. No. 103 619 31, such modeling is used to at least partially compensate for faults of individual functional units occurring during driving operation using the still intact functional units.

SUMMARY

A method for fault tree analysis of a technical system has been developed within the scope of the present invention. The technical system includes a plurality of functional units. The technical system is modeled as a tree-like logical linkage (fault tree) of causative events which may culminate in an undesirable event. The concept of the "undesirable event" includes not only a system failure, but rather very generally any nonfulfillment of a predefined key performance indicator.

The causative events include malfunctions of individual functional units. The functional units may include, for example, sensors, actuators, software components, and/or algorithms. However, for example, an operator, who causes a malfunction of a technical functional unit due to an incorrect operation, also comes into consideration as a functional unit. The causative events may also include, for example, the presence of specific operating conditions.

In the tree-like logical linkage, a causative event may in particular be an arbitrary logical linkage of lower-order events. If, for example, in an electronic stability program (ESP) for acquiring a measured value, five redundant sensors are provided, the event "measured value not acquired or acquired incorrectly" may occur if the event "sensor faulty" occurs at least three of the sensors. If still further interruptions occur in addition to the event "measured value not acquired or acquired incorrectly", the event "ESP out of service" may occur. This event may in turn result, in conjunction with the event "lateral acceleration above a threshold value," in the ultimate undesirable event "vehicle tips over".

The logical linkage of the causative events may be carried out using any arbitrary logical operators, i.e., for example, AND, OR, XOR, NOR, NAND, and NOT.

The events, in particular the possible malfunctions, may be stored in the tree-like logical linkage in particular with their particular occurrence probabilities.

A tree-like logical linkage having a self-similar structure is selected.

In this context, "self-similar" means that the structure is a fractal graph, i.e., the same base structure repeats similarly on multiple size scales. A fractal graph may be generated, for example, in that in the continuation from a previous order $n-1$ to the next order n, in the graph of the previous order n, each node is replaced by the structure of the order 1. The main difference from a fractal in the stricter sense is that the repetition is not continued into infinity, but rather only up to a finite order n. This is due to the circumstance that there is only a finite number of functional units in the technical system.

It has been found that the selection of a self-similar structure for the tree-like logical linkage drastically simplifies the ascertainment of the probability of an undesirable event.

The tree-like logical linkage is, for example, in applications for at least partially automated driving, a directed graph which contains an extremely large number of causative events as nodes. If the tree-like logical linkage is not directly given as a graph, but rather as a tree, there is thus a graph corresponding thereto. This graph may be ascertained, for example, according to (M. F. Chamow, "Directed graph techniques for the analysis of fault trees", IEEE Transaction on Reliability Vol R-27, No. 1, April 1978) or (H. P. Alesso et al., "Beyond Fault Trees to Fault Graphs", Lawrence Livermore National Laboratory Report, 1984).

In the tree-like logical linkage, the probability of an undesirable event is dependent on the probabilities of all causative events, in particular on each individual probability that a functional unit in the system has a malfunction. Thus, in addition to a comparatively large amount of processing time, a very large amount of data is also required for the analysis; the mentioned individual probabilities may definitely add up to more than 100 MB.

Moreover, the analysis is usually not only carried out only once, but rather repeated multiple times. In the specific application, the specification frequently includes a maximum admissible probability of an undesirable event. If the analysis for the concrete system yields that the requirement is not met, the system is to be modified accordingly. For example, a cost-effective component having a high probability of a malfunction may be replaced with a superior, more reliable component. A process may also be modified in such a way that it resorts to a smaller number of functional units, so that fewer individual faults may have an effect on the overall result of the process. The effects of these measures on the ultimate probability of the undesirable event are initially opaque, however. To check whether the probability of the undesirable event now corresponds to the requirement, the complete analysis has to be run again.

If the tree-like logical linkage of all individual probabilities to form the overall probability of the undesirable event has a self-similar structure, the behavior of the system as a whole may thus be inferred from the behavior of the self-similar repeating unit, in the way in which the complete structure of a crystal is known when its unit cell is known.

Statistical statements about said overall probability may thus be obtained significantly more rapidly and with significantly less data. It is accordingly apparent much faster upon each modification of the system whether it results in the desired success with respect to the overall probability.

In self-similar structures, a size s of a structural unit and number N of the copies of this structural unit required for complete coverage of a specified spatial area are typically linked to one another via a power law, for example, $N=s^d$, d being called the Hausdorff dimension and being neither 1 or 2.

Existing tree-like logical linkages (fault trees) for technical systems are typically not self-similar. To enjoy the substantially simplified analysis of a self-similar structure but at the same time to be able to further use the previously acquired knowledge about the linkage, a non-self-similar tree-like logical linkage is advantageously converted into a self-similar one.

The self-similar tree-like logical linkage may advantageously be selected, for example, from a predefined catalog, and/or from a parameterized approach, in such a way that it has the greatest possible similarity to the predefined, non-self-similar tree-like logical linkage. Further boundary conditions for the self-similar tree-like logical linkage may be introduced into the catalog or into the parameterized approach. The similarity may be measured, for example, using a distance measurement, which is explained in the space of the tree-like logical linkages.

Although it is advantageous to convert an existing non-self-similar tree-like logical linkage into a self-similar one, this is not necessarily required. If the technical system is examined for the first time using the method of the fault tree analysis, for example, an "empty" self-similar tree-like structure may thus be generated, for example, and the causative events may be associated with its nodes. It is then merely to be ensured that sufficient nodes are available at each point to be able to map the causations completely, i.e., every causative event has to have its place.

In another particularly advantageous embodiment, the states of all functional units are combined to form a state vector x, the change over time of which is given by applying the Laplace matrix L associated with the self-similar tree-like linkage and by an additive noise term w.

Laplace matrix L of a graph is defined as L:=D−A. Therein, D is the degree matrix, i.e., a diagonal matrix, the entries of which are the degrees of the individual nodes. A is the adjacency matrix, which indicates which nodes of the graph are connected by an edge.

The differential equation then results for state vector x $$\frac{dx}{dt} = -Lx + w.$$

Therein, w is a vector which has the same length as x and the components of which vary as white noise around zero. In particular, the statistical distribution of w may depict to what extent each functional unit of the technical system does, or does not do, what it is supposed to, in a deterministic manner.

Without noise term w, because of the self-similarity, state vector x would converge asymptotically toward a consensus which corresponds to the mean value of the initial states. With noise term w, the components of state vector x fluctuate around the mean values of the present states. This fluctuation is absorbed by the coherency of the network.

Reliability H of the system, which is a measure of the probability of the undesirable event, may be advantageously ascertained as the mean variance of the fluctuations of the N components of state vector x:

$$H := \frac{1}{N}\sum_{i=1}^{N}\lim_{t\to\infty}E\left\{x_i(t) - \frac{1}{N}\sum_{j=1}^{N}x_j(t)\right\}.$$

The logical linkage of the elements in state vector x is contained therein in matrix E.

The technical system may be, for example, a surroundings detection system and/or a control system of an at least partially automated driving vehicle. The functional units may include, for example, sensors, actuators, software components, and/or algorithms. In such systems, the analysis of the probability of an undesirable event with the aid of a tree-like logical linkage having a self-similar structure offers the special advantage that it may be carried out as an online check on the vehicle.

Many functional units on board the vehicle are continuously monitored by an onboard diagnosis unit. The failure of one or multiple functional units is generally indicated by warning lights and/or written into a fault memory. In contrast, it is not always apparent whether remedying the problem has to be carried out immediately for reasons of safety or may be delayed. The probability of a malfunction of the affected functional unit may be modified depending on the severity of the interruption in the self-similar tree-like logical linkage, for example, in reaction to the onboard diagnosis unit establishing a malfunction. In the case of complete failure, for example, this probability may be set to 1. The probability of the undesirable event may subsequently be updated.

If the probability of the undesirable event meets a predefined criterion, a suitable measure may be taken. The criterion may in particular include exceeding or falling below a threshold value. An acoustic and/or visual warning unit perceptible by the driver may be activated as the measure, for example. The system may also be entirely or partially deactivated, and/or the driver of the vehicle may be prompted to take over manual control. The vehicle may also be removed from the public traffic area and taken out of operation, possibly after a grace period defined in time or kilometers.

The drastic simplification which accompanies the self-similar structure of the tree-like linkage of causative events with the ultimate probability of the undesirable event thus enables an analysis to be carried out using the restricted processing capacity onboard the vehicle, which was previously reserved for larger computers outside the vehicle and also took a longer time. If a reliable statement may be obtained in this way about the extent to which the probability of the undesirable event has changed because of the failure, this is thus advantageous in particular if multiple different functional units fail simultaneously. While each of these failures may be noncritical per se, the combination of failures may possibly significantly increase the probability of the undesirable event. The possible combinations are sufficiently numerous that they may not even be run through beforehand.

Instead of reacting to an actually established malfunction of a functional unit, alternatively or also in combination, at least one probability of a malfunction of at least one functional unit may be incremented with increasing age and/or with increasing use of the functional unit and the probability of the undesirable event may be reanalyzed. Thus, for example, the simultaneous excessive wear of two brakes which may fill in for one another in the event of failure of only one brake may have the result that after the failure of the first brake, the second immediately becomes overloaded and also fails. The probability of a system failure of the brakes as a whole is thus increased disproportionately by the simultaneous wear. It is possible to react thereto as described above.

A malfunction in a vehicle dynamics system, which may normally be compensated for by well-maintained shock absorbers, may also result in swerving of the vehicle if the shock absorbers are worn out at the same time.

The method may be implemented entirely or partially in software and may be sold in particular as an update or upgrade for existing software on a computer or control unit. The software is thus an independently sellable product. The present invention therefore also relates to a computer program having machine-readable instructions which, when they are executed on a computer and/or on a control unit, prompt the computer and/or the control unit to execute the method according to the present invention. The present invention also relates to a machine-readable data carrier or a download product including the computer program.

According to the above description, the present invention also relates to a surroundings detection system and/or a control system for an at least partially automated driving vehicle. The system includes a plurality of functional units having mutual dependencies, which link the functional units in a tree-like structure in such a way that an undesirable event occurs if a logical linkage of causative events is true. The causative events include malfunctions of individual functional units. The tree-like structure is self-similar.

As explained above, it is entirely possible to characterize the behavior of a system which is not self-similar per se in case of fault on the basis of a modeling with the aid of a self-similar tree-like logical linkage. The preparation of such a self-similar tree-like linkage is even significantly simplified if the physical mutual dependencies of the functional units already form a self-similar structure. The effort for already designing the physical system as self-similar beforehand is thus rewarded in that the reliability of the system may be judged substantially more easily and rapidly. In particular, designing the system for a predefined maximum probability of an undesirable event is simplified. Furthermore, as described above, an online check also becomes possible in dependence on detected malfunctions and wear.

Both the length scale and the number of the nodes advantageously each change in the self-similar tree-like structure from one generation to the next by factors which are selected from a predefined catalog. The know-how about which self-similar tree-like structures are particularly suitable for which types of technical systems may be contained in this catalog, for example.

Further measures which improve the present invention will be described in greater detail hereafter together with the description of the preferred exemplary embodiments of the present invention on the basis of figures.

DETAILED DESCRIPTION

Figure 1:
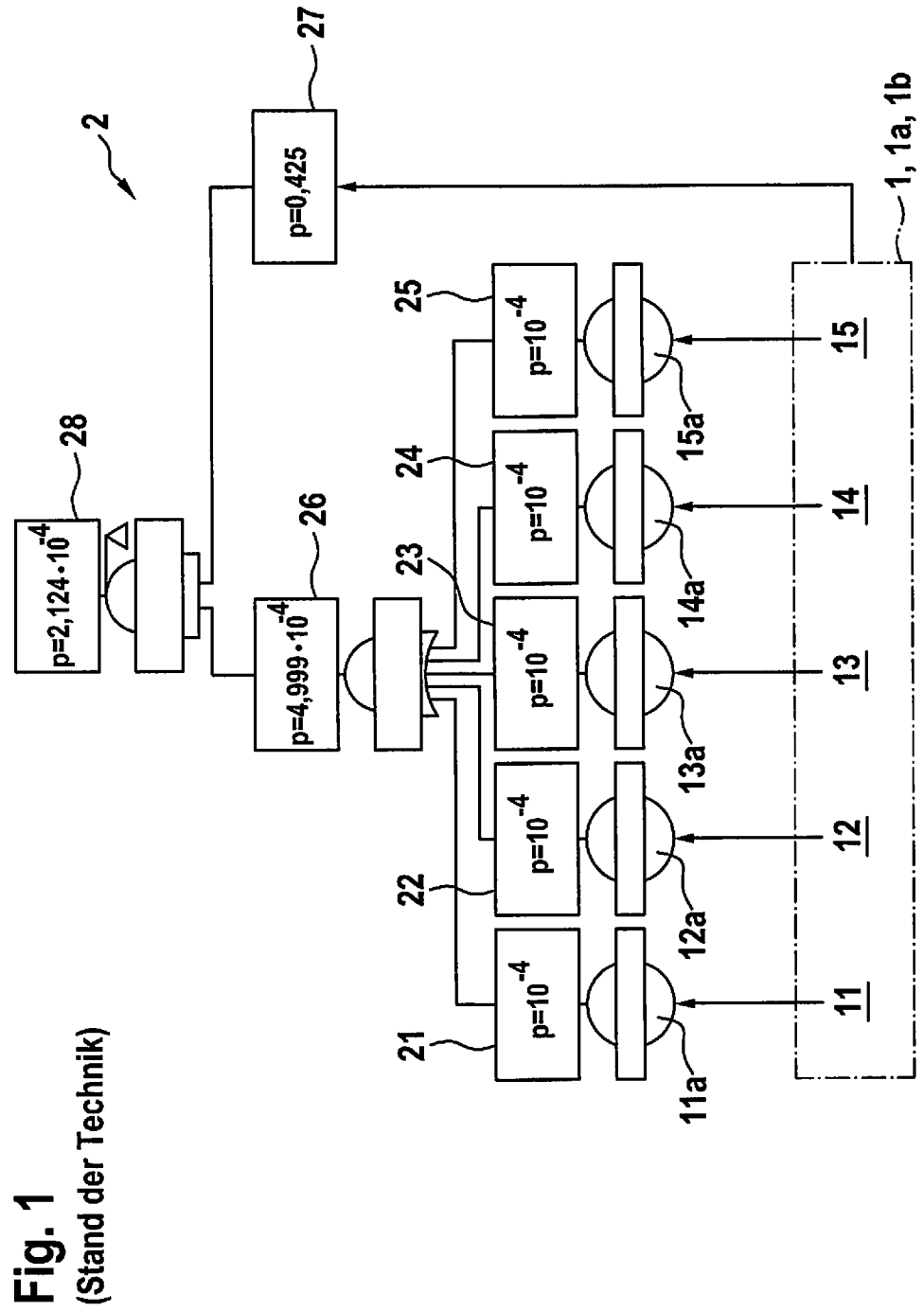
FIG. 1 shows an exemplary tree-like logical linkage 2 of events 21 through 27, which are carried out by an exemplary technical system 1, to a possible undesirable event 28.

According to FIG. 1, technical system 1 shown by way of example, which may be in particular a surroundings detection system 1a or a control system 1b of an at least partially automated driving vehicle, includes five functional units 11 through 15. The probability is sought that an undesirable event 28 will occur, and/or an effort is made to keep this probability below a predefined level. All probabilities are identified with letter p in FIG. 1.

As indicated by the symbol of the AND gate at undesirable event 28, the scenario assumed in FIG. 1 may only occur if two conditions are met simultaneously: on the one hand, a fault state 26 has to exist, and, on the other hand, the vehicle has to be in an operating state 27, in which fault state 26 also has an effect.

As indicated by the symbol of the OR gate at fault state 26, fault state 26 may go back through one or multiple of events 21 through 25, which are in turn triggered by malfunctions 11a through 15a of functional units 11 through 15 of system 1. Each of these events 21 through 25 has a probability of $10^{-4}$, i.e., fault state 26 has a probability of $4.999*10^{-4}$.

Operating state 27, which is also contingent on system 1, does not represent a fault in itself, but decides whether fault state 26 has an effect up to undesirable event 28. If fault state 26 occurs in a situation in which operating state 27 does not directly exist, the fault is thus quasi "intercepted".

Operating state 27 exists on average during 42.5% of the operating time; its probability is thus 0.425. A probability of $2.124*10^{-4}$ for undesirable event 28 results therefrom and from the probability of fault state 26.

If this probability is excessively high for the requirements of the customer, measures have to be taken to make certain causative events 21 through 27 more improbable. The probability of operating state 27 may be adapted with the most difficulty, since this operating state 27 is part of the intended normal use of the vehicle. Reducing the probabilities for malfunctions 11a through 15a of functional units 11 through 15 by replacing functional units 11 through 15 with higher-quality models thus comes into consideration. It is also possible to modify the interaction of functional units 11 through 15 in such a way that a fault state 26 only results in the event of a simultaneous malfunction of at least two of functional units 11 through 15. The probability of fault state 26 thus already drops to $5*10^{-4}*4*10^{-4}=2*10^{-7}$.

The simple example shown in FIG. 1 may also be intuitively analyzed. In real systems having an extremely large number of possible events, a very high processing effort arises. To make this effort manageable at all, tree-like logical linkage 2 generally has to be transformed (for example, using the Kohda-Henley-Inous comprehensive method or the Yllera method), to decompose linkage 2 into modules and to find "minimal cut sets" in which redundancies are eliminated.

Figure 2:
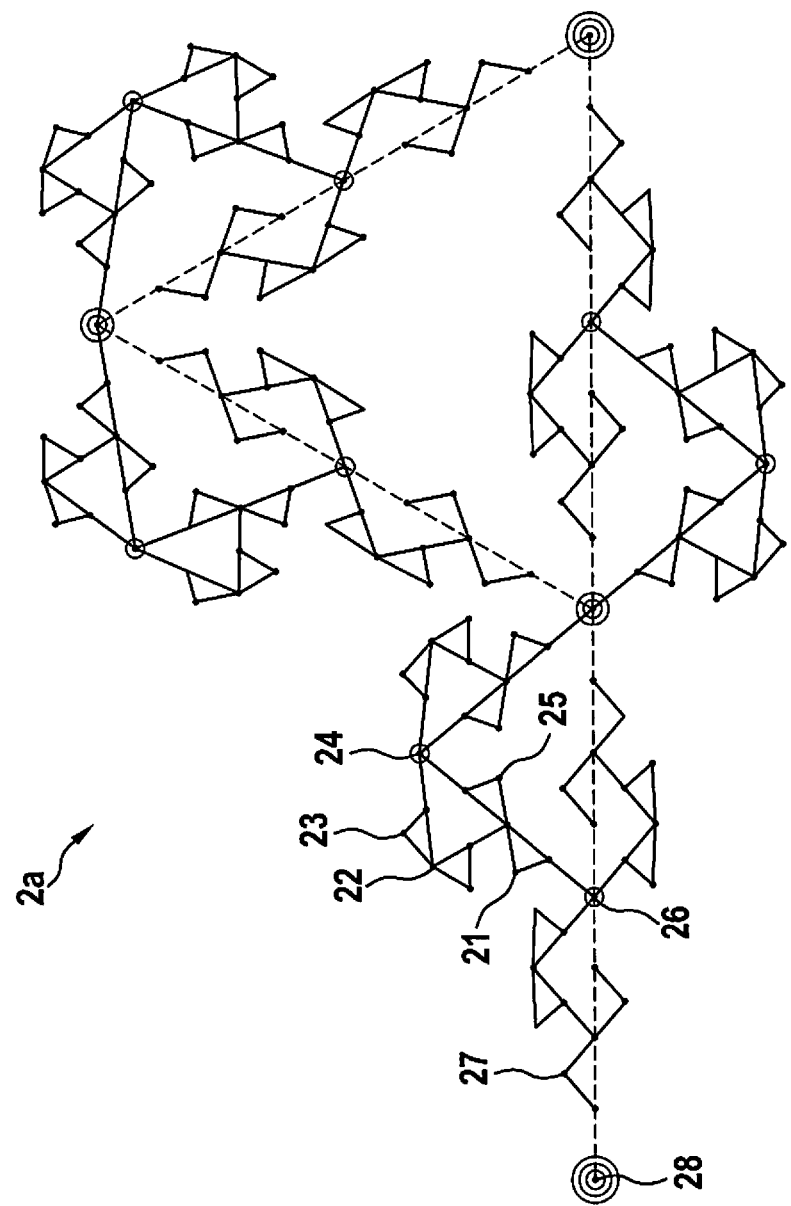
FIG. 2 shows a self-similar version 2a of tree-like logical linkage 2 shown in FIG. 1.

FIG. 2 shows an exemplary self-similar version 2a of tree-like logical linkage 2 shown in FIG. 1. Self-similar tree-like logical linkage 2a was generated by copying the unit shown by dashed lines in FIG. 2 from generation to generation in smaller scale on every connecting line between nodes. Causative events 21 through 27 and undesirable event 28 are shown by way of example in FIG. 2 and only occupy a small part of the available nodes therein. In a real system, significantly more nodes are occupied.

The conversion of non-self-similar tree-like logical linkage 2 into self-similar version 2a is not unique. Another self-similar structure could thus instead also be used, as long as there is an area which accurately depicts the cascading interactions between causative events 21 through 27 and undesirable event 28.

Figure 3:
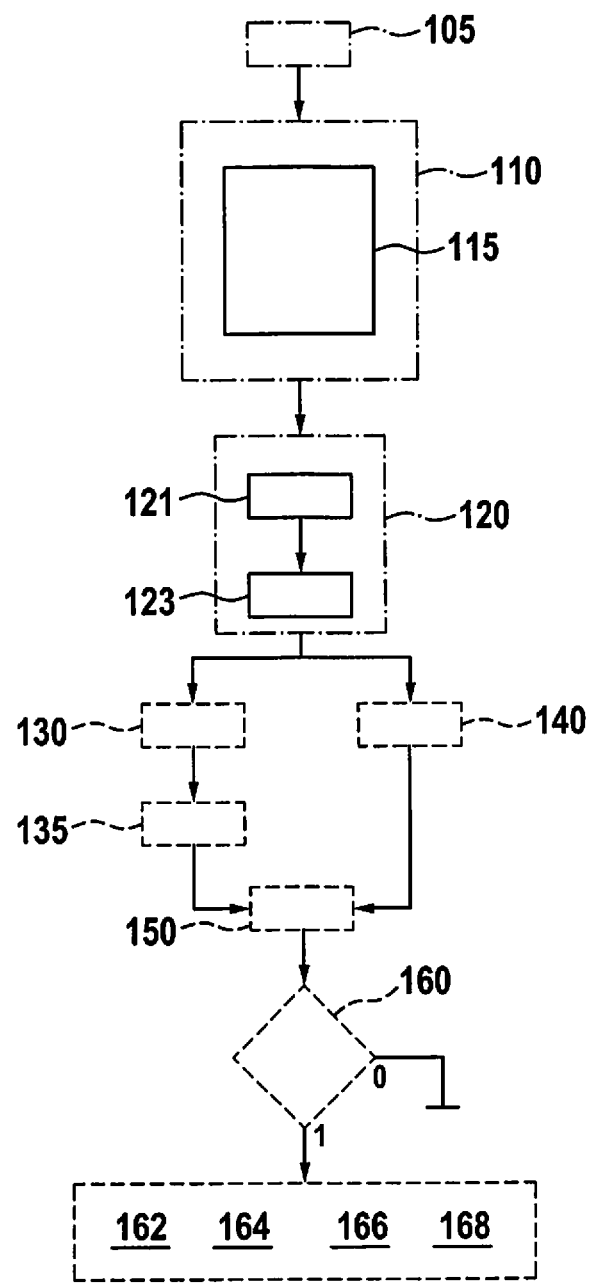
FIG. 3 shows an exemplary embodiment of method 100.

FIG. 3 shows an exemplary embodiment of method 100. According to step 105, a surroundings detection system 1a or control system 1b is selected as technical system 1 to be analyzed.

To be able to model system 1 for the purposes of fault tree analysis, in step 110, a self-similar tree-like logical linkage suitable for this purpose is ascertained for those events 21 through 27, which may result in an undesirable event 28.

An exemplary way of doing this is shown in FIG. 3. According to this way, in block 115, the self-similar tree-like logical linkage 2a is selected from a catalog or from a parameterized approach, which has the greatest possible similarity to non-self-similar original 2.

In step 120, system 1 is modeled with the aid of self-similar tree-like logical linkage 2a. For this purpose, according to block 121, the states of all functional units 11 through 15 are combined to form a state vector x. In block 123, the mean variance of the fluctuations of components of this state vector x is ascertained as a measure of the probability of undesirable event 28.

In the example shown in FIG. 3, especially for application in an at least partially automated driving vehicle, the correct function of functional units 11 through 15 in system 1 is progressively monitored by an onboard diagnosis unit of the vehicle according to block 130. If a malfunction 11a through 15a is established, according to block 135, the probability of malfunction 11a through 15a is accordingly modified in self-similar tree-like logical linkage 2a. Alternatively or also in combination therewith, according to block 140, the probability of malfunction 11a through 15a is incremented with increasing age and/or with increasing use of particular functional unit 11 through 15.

After the probabilities for malfunctions 11a through 15a of functional units 11 through 15 have been modified in self-similar tree-like logical linkage 2a, in step 150, the probability of undesirable event 28 is reanalyzed on the basis of updated linkage 2a. It is subsequently checked in block 160 whether the reanalyzed probability meets a predefined criterion.

If the criterion is not met (logical value 0 in block 160), no action is required.

If the criterion is met (logical value 1 in block 160), individually or in combination, according to block 162, the driver may be warned using a warning unit, according to block 164, the system may be deactivated, according to block 166, the driver may be prompted to take over control, or, according to block 168, the vehicle may be removed from the public traffic area and taken out of operation.

Figure 4:
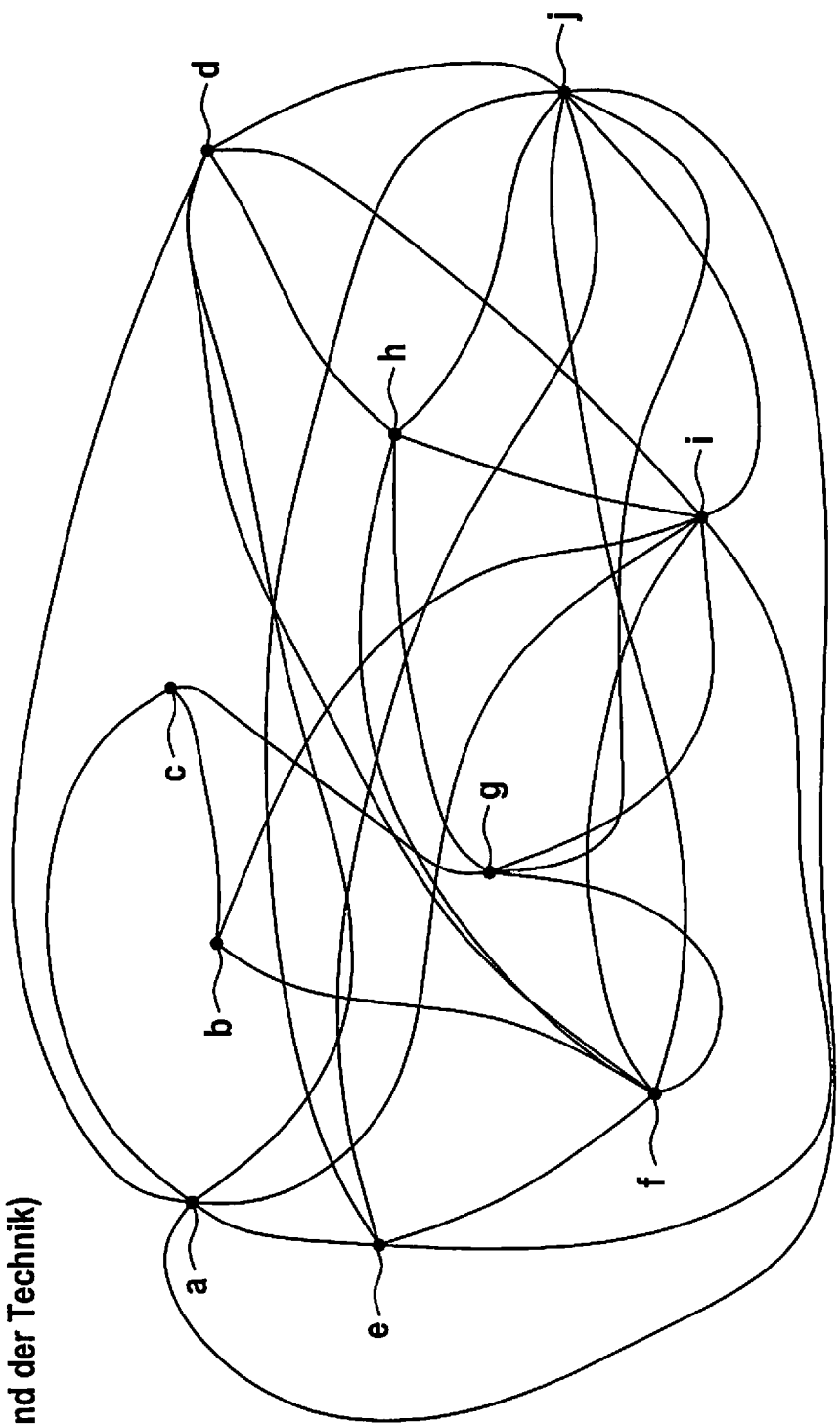
FIG. 4 shows a chaotic dependence diagram of an exemplary, non-self-similar tree-like logical linkage.

FIG. 4 illustrates once again the advantage which a self-similar tree-like logical linkage 2a offers. In FIG. 4, the dependencies between events shown as points a through j, which result from an exemplary non-similar structure of logical linkage 2 between events a through j, are outlined. Events a through j may represent, for example, the failure of software components or algorithms. The chaotic structure of the dependencies has the result that a change at an arbitrary point in the system triggers an unforeseeable cascade of consequences. In order to determine the effect of the change on the overall probability of an undesirable event 28, all these consequences have to be taken into consideration, which requires a correspondingly large amount of data and large amount of processing capacity. Such chaotic relationships are avoided using a self-similar tree-like logical linkage 2a.

What is claimed is:

1. A method for performing a fault tree analysis of a technical system that includes a plurality of functional units, the method comprising:
   modeling the technical system as a tree-like logical linkage of causative events that culminate in an undesirable event, the causative events including malfunctions of individual ones of the functional units;
   selecting the tree-like logical linkage so as to have a self-similar structure;
   modifying, in response to a malfunction having been established in at least one of the functional units by an onboard diagnosis unit of a vehicle, a probability of a malfunction of the at least one malfunctioning functional unit in the self-similar tree-like logical linkage; and
   reanalyzing a probability of the undesirable event;
   wherein, in response to the reanalyzed probability meeting a predefined criterion, performing at least one of:
      activating at least one of an acoustic warning unit and a visual warning unit perceptible by a driver of the vehicle,
      one of entirely deactivating and partially deactivating the technical system,
      prompting the driver of the vehicle to take over a manual control, and
      removing the vehicle from a public traffic area and taking the vehicle out of operation.

2. The method as recited in claim 1, further comprising:
   ascertaining, from at least one of a predefined catalog and a parameterized approach, a self-similar tree-like logical linkage that has a greatest possible similarity to a predefined, non-self-similar tree-like logical linkage.

3. The method as recited in claim 1, further comprising:
   combining states of all the functional units to form a state vector x, wherein a change over time of the state vector x is given by application of a Laplace matrix L associated with the self-similar tree-like logical linkage and by an additive noise term w.

4. The method as recited in claim 3, further comprising:
   ascertaining a mean variance of fluctuations of components of the state vector x in a stationary state of the technical system as a measure of a probability of the undesirable event.

5. The method as recited in claim 1, wherein the technical system includes at least one of a surroundings detection system and a control system of an at least partially automated driving vehicle, and wherein the functional units include at least one of sensors, actuators, software components, and algorithms.

6. The method as recited in claim 5, further comprising:
   incrementing at least one probability of a malfunction of at least one functional unit with an increase in at least one of an age and use of the functional unit in the self-similar tree-like linkage; and
   reanalyzing a probability of the undesirable event.

7. The method as recited in claim 1, wherein a length scale and a number of nodes each change from one generation to a next generation in the self-similar tree-like logical linkage by factors which are selected from a predefined catalog.

8. A non-transitory computer-readable storage medium on which is stored a computer program containing machine-readable instructions which, when executed on at least one of a computer and a control unit, prompt the at least one of the computer and the control unit to perform a fault tree analysis of a technical system that includes a plurality of functional units, the computer program, when executed by the at least one of the computer and the control unit, causing the at least one of the computer and control unit to perform the following steps:
- modeling the technical system as a tree-like logical linkage of causative events that culminate in an undesirable event, the causative events including malfunctions of individual ones of the functional units;
- selecting the tree-like logical linkage so as to have a self-similar structure;
- modifying, in response to a malfunction having been established in at least one of the functional units by an onboard diagnosis unit of a vehicle, a probability of a malfunction of the at least one malfunctioning functional unit in the self-similar tree-like logical linkage; and
- reanalyzing a probability of the undesirable event;
- wherein, in response to the reanalyzed probability meeting a predefined criterion, performing at least one of:
  - activating at least one of an acoustic warning unit and a visual warning unit perceptible by a driver of the vehicle,
  - one of entirely deactivating and partially deactivating the technical system,
  - prompting the driver of the vehicle to take over a manual control, and
  - removing the vehicle from a public traffic area and taking the vehicle out of operation.

9. The non-transitory computer-readable storage medium as recited in claim 8, wherein the technical system includes at least one of a surroundings detection system and a control system of an at least partially automated driving vehicle, and wherein the functional units include at least one of sensors, actuators, software components, and algorithms.

10. A method for performing a fault tree analysis of a technical system that includes a plurality of functional units, the method comprising:
- modeling the technical system as a tree-like logical linkage of causative events that culminate in an undesirable event, the causative events including malfunctions of individual ones of the functional units;
- selecting a tree-like logical linkage having a self-similar structure;
- incrementing at least one probability of a malfunction of at least one functional unit with an increase in at least one of an age and use of the functional unit in the self-similar tree-like linkage; and
- reanalyzing a probability of the undesirable event;
- wherein, in response to the reanalyzed probability meeting a predefined criterion, performing at least one of:
  - activating at least one of an acoustic warning unit and a visual warning unit perceptible by a driver of a vehicle,
  - one of entirely deactivating and partially deactivating the technical system,
  - prompting the driver of the vehicle to take over a manual control, and
  - removing the vehicle from a public traffic area and taking the vehicle out of operation.

11. The method claim 10, wherein the technical system includes at least one of a surroundings detection system and a control system of an at least partially automated driving vehicle, and wherein the functional units include at least one of sensors, actuators, software components, and algorithms.

* * * * *